United States Patent [19]

Beynié

[11] Patent Number: 4,550,403
[45] Date of Patent: Oct. 29, 1985

[54] METHOD FOR TRANSMITTING A HDBn CODE SIGNAL WITH AN AUXILIARY BINARY SIGNAL IN A DIGITAL TRANSMISSION LINE AND SYSTEM FOR MONITORING REPEATERS IN THE LINE BY MEANS OF AUXILIARY SIGNALS

[75] Inventor: Claude P. Beynié, La Varenne, France

[73] Assignee: Societe Anonyme de Telecommunications, Paris, France

[21] Appl. No.: 479,905

[22] Filed: Mar. 29, 1983

[30] Foreign Application Priority Data

Mar. 29, 1982 [FR] France .................... 82 05327

[51] Int. Cl.$^4$ ............ H04J 3/12; H04J 1/16; H04J 3/14
[52] U.S. Cl. .................... 370/110.1; 370/13; 370/118; 370/110.4; 371/5
[58] Field of Search ............ 370/13, 110.1, 110.4, 370/118, 111; 371/5; 179/175.31 R

[56] References Cited

U.S. PATENT DOCUMENTS

| | | | |
|---|---|---|---|
| 3,636,524 | 1/1972 | Holland | 370/11 |
| 3,870,828 | 3/1975 | Saliga | 370/110.4 |
| 4,131,761 | 12/1978 | Giusto | 370/110.4 |
| 4,151,373 | 4/1979 | Widmer et al. | 370/111 |
| 4,334,303 | 6/1982 | Bertin et al. | 370/13 |
| 4,387,460 | 6/1983 | Boutmy et al. | 370/110.4 |

OTHER PUBLICATIONS

Articli by T. A. Moore, published in "The Radio and Electronic Engineer", vol. 44, No. 8, pp. 421–427, Aug., 1974.

Primary Examiner—Douglas W. Olms
Assistant Examiner—Kenneth I. Rokoff
Attorney, Agent, or Firm—Lowe, King, Price & Becker

[57] ABSTRACT

A signal in HDBn code is transmitted with an auxiliary binary signal having a lower bit-rate on a digital transmission line. The HDBn code signal comprises predetermined sequences each including $n+1$ elements, $n-1$ central elements being zeros and a last element being a bipolarity violation mark. In each sequence of the HDBn code signal transmitted during each of binary elements of the auxiliary signal having a predetermined binary state, a bipolar mark in the sequence is permutated with a zero element having a predetermined rank in the sequence to derive an encoded sequence. The HDBn code signal is an information signal in the transmission line and the auxiliary signal can be a signal for remotely locating the repeater in the line from a monitoring end equipment of a monitoring system or for indicating performance factors of the repeaters, such as error rates, to the monitoring equipment.

20 Claims, 7 Drawing Figures

METHOD FOR TRANSMITTING A HDBN CODE SIGNAL WITH AN AUXILIARY BINARY SIGNAL IN A DIGITAL TRANSMISSION LINE AND SYSTEM FOR MONITORING REPEATERS IN THE LINE BY MEANS OF AUXILIARY SIGNALS

BACKGROUND OF THE INVENTION

1. Field of the Invention

This invention relates to a method for transmitting a signal in HDBn code combined with an auxiliary binary signal on a digital transmission medium. The auxiliary signal has a lower bit-rate than the bit-rate of the HDBn code signal. The HDBn code signal comprises four predetermined and different sequences each having $(n+1)$ successive elements whose $(n-1)$ central elements are zeros and whose last element is a bipolarity violation mark.

More particularly, the invention concerns such a method specially adapted to the monitoring of pairs of repeaters in a bidirectional digital transmission line between a monitoring end equipment and a monitored end equipment.

2. Description of the Prior Art

The majority of known repeater monitoring systems involve a frequency combination of the information signal whose in-line code is an HDBn code, and of one or more binary remote locate signals which modulate a low-frequency subcarrier with a frequency decidedly lower than that of the information signal. The end equipments and repeaters in these systems comprise, associated with each of two channels of the line, separating and combining filters for the low-frequency remote locate auxiliary signals transmitted from the monitoring equipment or low-frequency auxiliary signals representative of repeater error rates and transmitted from the repeaters with the respective information signal toward the monitoring equipment. The filters consists of transformers and shock coils which have the drawback of being heavy and cumbersome. Additionally, the use of such filters prevents high ratios between the information signal bit-rate and the auxiliary signal bit-rate. This results in restricting any remote monitoring of high bit-rate digital information signals using low-frequency auxiliary signals; this bit-rate is becoming much more common-place in digital transmission trunks between multistage multiplexers-demultiplexers.

OBJECTS OF THE INVENTION

The main object of this invention is to overcome the foregoing drawbacks.

Another object of this invention is to do away with the need for a carrier frequency in order to transmit the auxiliary signals.

A further object of this invention is to obviate any detrimental spectral congestion of the base band that the auxiliary signals might cause.

SUMMARY OF THE INVENTION

In each sequence of $(n+1)$ successive elements in the HDBn code signal that is transmitted during each auxiliary signal element having a predetermined binary state and is identical to one same predetermined sequence such as above defined, a predetermined bipolar mark included in the sequence is permutated with a zero having a predetermined rank in the sequence to derive an encoded sequence.

Transmission of the auxiliary signal simultaneously with the HDBn code information signal is thus carried out by a modification of predetermined element sequences of the HDBn code signal, i.e. without modifying the number of + and − bipolar marks during a predetermined period.

By comparison with the combining filters and modulators in the known monitoring systems, an encoder for obtaining the encoded sequences and a decoder for decoding the encoded sequences can be integrated and thus offer much reduced costs and dimensions. Furthermore, no limit on the ratio between the bit-rate of auxiliary binary signals and the bit-rate of the HDBn code information signal is required.

The method in accordance with the invention is applied in particular to the remote monitoring of bidirectional pairs of repeaters included in a digital transmission line between a monitoring end equipment and a monitored end equipment. An auxiliary remote locate signal is transmitted from the monitoring equipment to the monitored equipment for interrogating remote locate means associated with the repeater pairs. An auxiliary response signal responsive to the remote locate signal is transmitted from the remote locate means in the pair of repeaters toward the monitoring equipment. The auxiliary signal bits having the predetermined binary state modify one or more predetermined sequences included in the respective HDBn code information signals delivered from the end equipments.

BRIEF DESCRIPTION OF THE DRAWING

Further advantages of the present invention will be more clearly apparent from the following more particular description of preferred embodiments of this invention in reference to the corresponding accompanying drawings in which.

DESCRIPTION OF THE PREFERRED EMBODIMENTS

A reminder is first of all given of the features regarding a high-density binary code HDBn as referred to for example in an article by T. A. Moore, published in "THE RADIO AND ELECTRONIC ENGINEER", Vol. 44, No. 8, pagaes 421 to 427, August 1974.

A digital signal in HDBn code is a bipolar signal in which a binary zero is coded as "0" and a binary code is alternately coded as a bipolar mark + or −. In the HDBn code, n is a predetermined integral number indicating the maximum number of successive zeros that may be contained in the bipolar signal. In a sequence of successive zeros in the initial binary signal comprising more than (n+1) zeros, each sequence of (n+1) successive zeros is replaced by one of four predetermined sequences a, b, c, d which is in the form of B0 . . . 0V or 00 . . . 0V. The mark V is a bipolar mark which violates the bipolarity, i.e. which has the same polarity as the previously transmitted mark; the sign carried by the mark V is the opposite of that on the last mark having violated the bipolarity. The bipolar mark B obeys the alternation in polarity: if the bipolar mark preceding the sequence and the sequence bipolarity violation mark V have the same sign, then the mark B is a zero, which corresponds to a sequence b or c; if the bipolar mark preceding the sequence and the sequence bipolarity violation mark V have opposite signs, then the mark B has an opposite sign to that of the previous bipolar mark, which corresponds to a sequence a or d. Table I below gives the configuration of the four predetermined sequences in terms of the mark immediately preceding the sequence of (n+1) successive zeros and the previous mark having violated the bipolarity.

TABLE I

| Previous mark | Previous violation mark | Modified predetermined sequence corresponding to (n + 1) zeros |
| --- | --- | --- |
| + | + | a : − 0 . . . 0 − |
| − | + | b : 0 0 . . . 0 − |
| + | − | c : 0 0 . . . 0 + |
| − | − | d : + 0 . . . 0 + |

Figure 1:
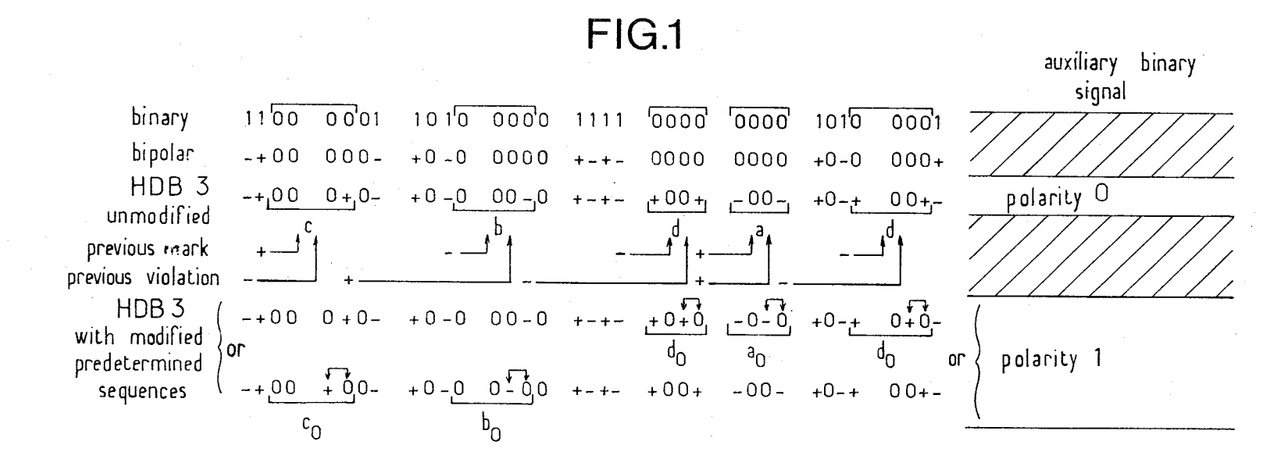
FIG. 1 shows waveforms for the HDB3 coding of an information binary signal and for the encoding of predetermined HDB3 code sequences including $n+1=4$ successive elements during "1" binary elements of an auxiliary binary signal.

By way of an example, the first three lines in FIG. 1 depict a binary signal, the corresponding bipolar signal and the corresponding signal in HDB3 code (n=3), respectively. The fourth and fifth lines in FIG. 1 indicate the previous bipolar mark and the previous bipolarity violation mark that precede each sequence of (n+1) successive zeros in the binary or bipolar signal.

According to the invention, predetermined sequences of the digital information signal in HDBn code to be transmitted are modified when an auxiliary binary signal has a predetermined binary state. The auxiliary binary signal is transmitted over a same transmission medium as that of the information signal in HDBn code in a digital transmission system. The auxiliary binary signal has a binary rate much below that of the information signal such that during the elementary period of a binary element in the auxiliary signal, a statistically high number of predetermined sequences destined for modification in the information signal are transmitted. Rephrasing this, one of the binary states in the auxiliary signal is recognized when several predetermined sequences of the HDBn code are present during the elementary period and are modified such that they cannot be normally present in the information signal, in the absence of any auxiliary signal.

The following convention is adopted. The "zero" state binary elements of the auxiliary signal do not modify the information signal and the predetermined "one" state binary elements of the auxiliary signal modify one or more of the four predetermined sequences in the HDBn code signal. Each sequence a, b, c, d to be modified is converted into an encoded or modified sequence $a_0$, $b_0$, $c_0$, $d_0$ which results from the permutation of a zero binary element having a predetermined rank in the sequence, with a bipolar mark + or − in the predetermined sequence a, b, c, d, or which results from two such permutations with respect to the two bipolar marks when these are contained in the predetermined sequence such as a or d. Table II below summarizes the various modifications possible which can be applied to the four different predetermined HDBn code sequences.

TABLE II

| Predetermined sequence | Encoded or Modified sequence | | |
| --- | --- | --- | --- |
| a : − 0 . . . 0 − | $a_0$ : 0 0 . . . | 0 − 0 . . . | 0 − |
| | or 0 0 . . . | 0 − 0 . . . 0 − 0 . . . | 0 0 |
| | or − 0 . . . | 0 − 0. . . | 0 0 |
| b : 0 0 . . . 0 − | $b_0$ : 0 0 . . . | 0 − 0 . . . | 0 0 |
| c : 0 0 . . . 0 + | $c_0$ : 0 0 . . . | 0 + 0 . . . | 0 0 |
| d : + 0 . . . 0 + | $d_0$ : 0 0 . . . | 0 + 0 . . . | 0 + |
| | or 0 0 . . . | 0 + 0 . . . 0 + 0 . . . | 0 0 |
| | or + 0 . . . | 0 + 0 . . . | 0 0 |

By way of an example, it is assumed that the bipolar code for the PCM information signal is the HDB3 code and that two predetermined sequences are to be modified. The two predetermined sequences can be a and d as illustrated in the sixth line of FIG. 1, or b and c as illustrated in the seventh line in FIG. 1. For both these cases, there is only one permutation. The permutation is relative to the last so-called bipolarity violation mark + or − and the last zero having a predetermined rank equal to three in the corresponding sequence of (n+1)=4 zeros.

The modified sequences are:

$a_0 = -0-0$ and $d_0 = +0+0$, or $b_0 = 0\,0-0$ and $c_0 = 0\,0+0$.

The two sequences to be modified or encoded are preferably a and d since at the receiver end, the decoding of the modified sequences $b_0$ and $c_0$ requires detection in a sequence of (n+2) and no longer (n+1) bipolar elements, since the bipolar mark preceding said sequence must be considered.

If, for instance, consideration is lent to a PCM information signal that has a binary rate of 2048 kbits/s and results from multiplexing thirty-two 64 kbit/s telephone channels, then the auxiliary digital signal has a binary rate of less than one kbit/s, and is equal to 200 bit/s for example. During the elementary period of each auxiliary signal binary element equal to $10^3/200 = 5$ ms, $2048/0.2 = 10240$ elements of the information signal are transmitted. In an information signal of this nature, the statistical time interval which separates two usable bipolarity violations, i.e. two sequences such as a, d or b, c, corresponds to thirty-two binary elements, i.e. $32/(2048 \times 10^3) = 15.625$ μs. The average number of predetermined sequences modified during the elementary period of one state "1" binary element of the auxiliary signal is statistically equal to $5 \times 10^3/15.625 = 320$. This high number makes it possible to avoid any error in decoding the auxiliary signal. A decoder embodying the invention enables a binary element "1" in the auxiliary signal, for example, when the decoder has recognized a number of modified sequences lying between 280 and 360 over the elementary period of 5 ms.

Figure 2:
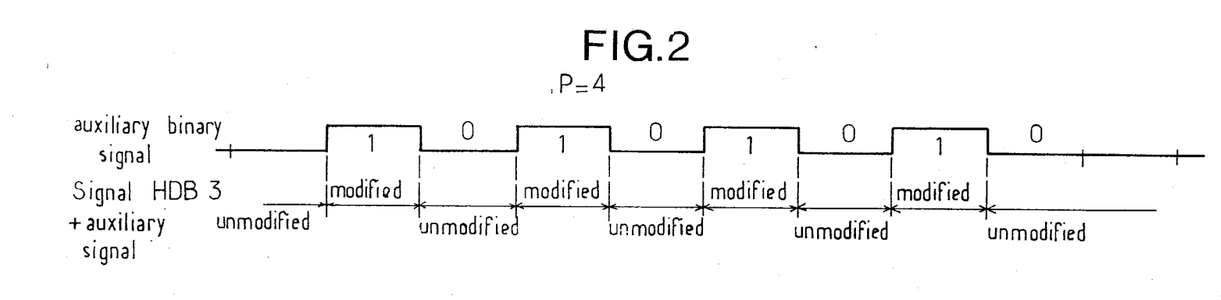
FIG. 2 is a time diagram of a HDB3 code signal modified by a recurring word "10" of an auxiliary bindary signal.

To obviate any mistake at the receiver end, when restoring the auxiliary signal, each binary word of the auxiliary signal is successively repeated in the transmission end, P times for instance, in order to form an auxiliary sequence. P is an integral number greater than two and in practice equal to ten or so. In FIG. 2, it is assumed that the recurring word consists of two bits, such as "1" and "0", and is repeated P=4 times. At the receiver end, once four successive identical words "10" each covering a period 2×5=10 ms are detected by digital filtering, the auxiliary word such as "10" is enabled and interpreted accordingly.

Figure 3:
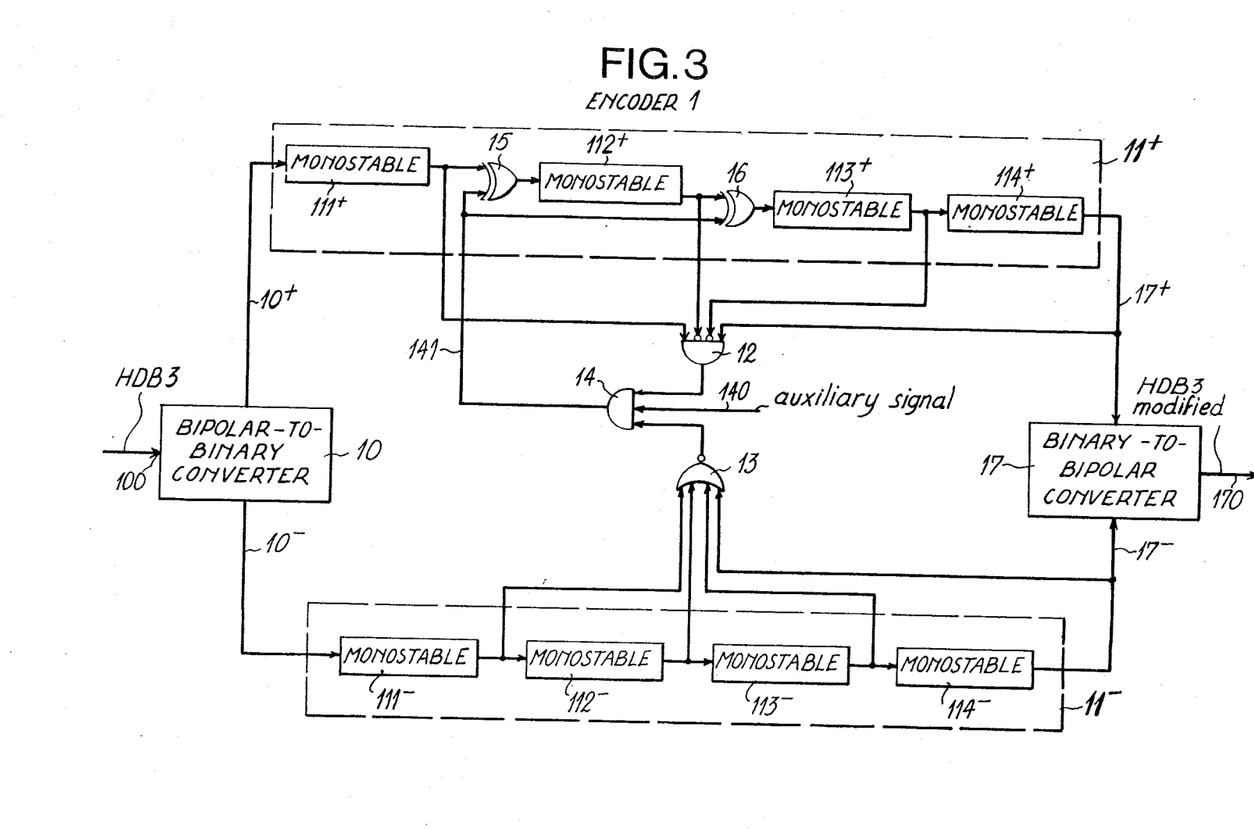
FIG. 3 is a block diagram of an encoder embodying the invention.
Figure 4:
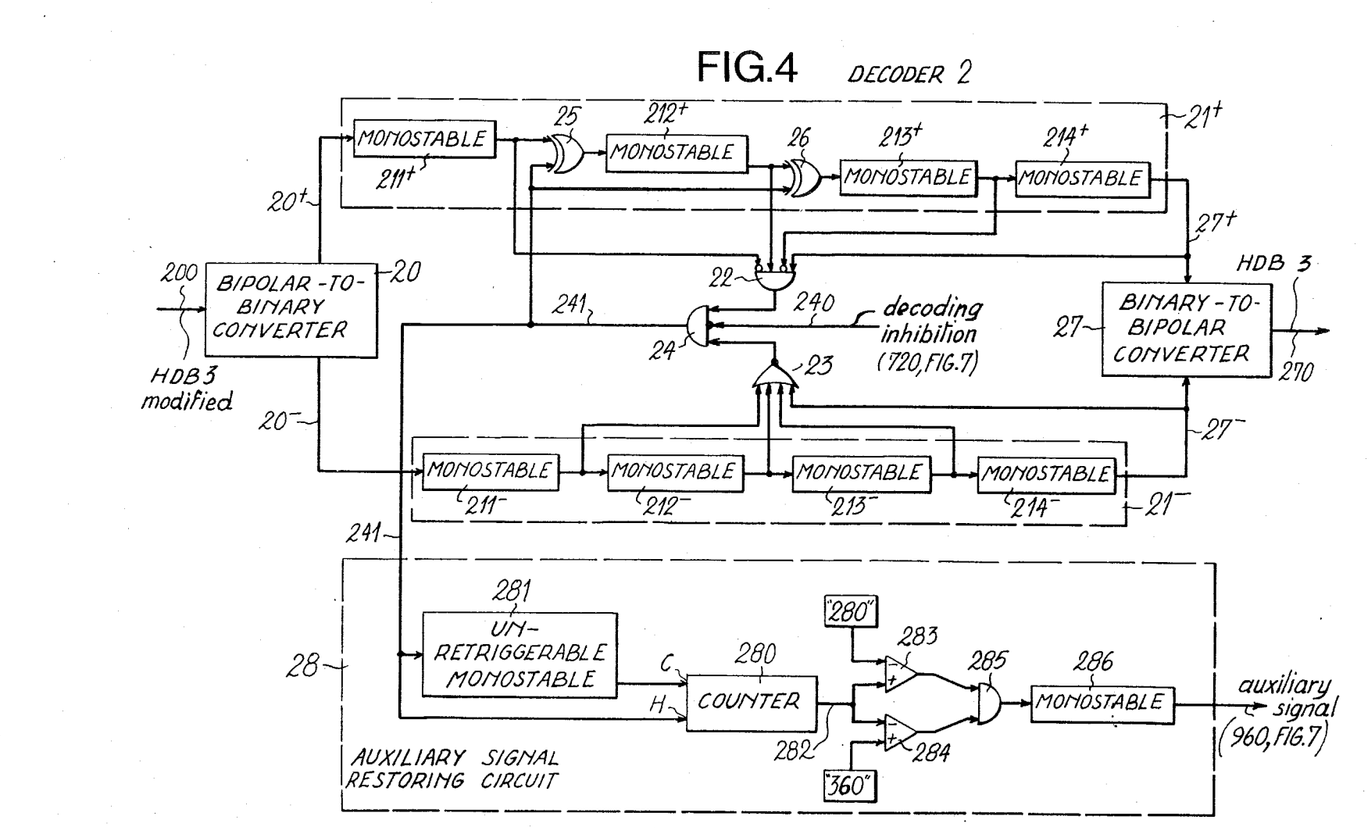
FIG. 4 is a block diagram of a decoder embodying the invention.

FIGS. 3 and 4 respectively depict an encoder and a decoder embodying the invention for which, throughout the elementary period of an auxiliary signal state "1" binary element, only the sequences $d = +0\ 0+$ of an information signal in HDB3 code are modified to give encoded sequences $d_0 = 0+0+$; in this example, the first bipolar mark in the sequence d is permutated with the zero having a predetermined rank equal to two in the sequence d.

The encoding and decoding operations are based on the fact that to detect a sequence such as d or $d_0$, the sequence converted into binary code for the same polarity as the marks it contains, corresponds to a sequence of zeros after conversion into binary code for an opposite polarity. The encoder and decoder therefore comprise at the input a known bipolar-to-binary converter which converts the received signal in HDB3 code into two binary signals HDB3+ and HDB3− and at the output a known binary-to-bipolar converter which converts the HDB3+ and HDB3− encoded or decoded binary signals into a signal in HDB3 code. The encoding and decoding operations are performed using shift registers.

With reference to FIG. 3, the encoder 1 comprises a bipolar-to-binary converter 10 with an input 100 receiving the information signal in HDB3 code. The converter 10 converts the information signal into two binary signals HDB3+ and HDB3− at two outputs 10+ and 10−. The signal HDB3+ comprises "1" bits which correspond to the +bipolar marks in the information signal, and "0" bits which correspond to the −bipolar marks and zeros in the information signal. The signal HDB3− comprises "1" bits which correspond to the −bipolar marks in the information signal, and "0" bits which correspond to the +bipolar marks and zeros in the information signal.

Connected to each output 10+, 10− from the converter 10 is a shift register 11+, 11− having four stages. Each stage consists of a monostable flip-flop 111+ to 114+, 111− to 114−.

In the register 11+, the outputs of the first and fourth flips-flops 111+ and 114+ are connected to two direct inputs of an AND gate 12, and the outputs of the second and third flips-flops 112+ and 113+ are connected to two inverse inputs of the AND gate 12. The output of the gate 12 is at the "1" state when the outputs of flips-flops 111+ to 114+ are at the "1", "0", "0", "1" states respectively. Binary word "1001" corresponds to the conversion of the sequence $d = +0\ 0+$ into positive binary code HDB3+.

The output of the flips-flops 111− to 114− in the second register 11− are connected to inputs of a NOR gate 13. The output of the gate 13 is at the "1" state when the outputs of flips-flops 111− to 114− are all at the "0" state, which corresponds to the conversion of the sequence $d = +0\ 0+$ into the negative binary code HDB3−.

In the encoder 1, an AND gate 14 has two inputs that are connected to the outputs of the gates 12 and 13, and a third input 140 which receives the auxiliary binary signal. Output 141 of the gate 14 is at the "1" state when a sequence $d = +0\ 0+$ is detected by the gates 12 and 13 and when the auxiliary signal is at the "1" state, whereupon the sequence d is to be modified into the encoded sequence $d_0 = 0+0+$. For this purpose, the first register 11+ comprises two OR-EXCLUSIVE gates 15 and 16 which perform the permutation of the first bipolar mark + and the first zero in the sequence d, or to be more exact, the encoding of the first above-mentioned mark + into a zero and the first above-mentioned zero into a bipolar mark +. One input of the gate 15 is connected to the output of the first flip-flop 111+, and the output of the gate 15 is connected to the input of the following flip-flop 112+. One input of the gate 16 is connected to the output of the second flip-flop 112+, and the output of the gate 16 is connected to the input of the third flip-flop 113+. The other inputs of both OR-EXCLUSIVE gates 15 and 16 are connected to the output 141 of the AND gate 14. When the sequences "1001" and "0000" are not contained in the registers 11+ and 11−, the information signal goes unmodified; the output 141 of AND gate 14 is in the "0" state and the gates 15 and 16 are transparent. When the output 141 of the gate 14 is at the "1" state, the gate 15 encodes the first "1" bit which corresponds to the first + mark in the sequence d into a "0" bit, and the gate 16 encodes the first "0" in the sequence d into a "1" bit which corresponds to the first + mark in the sequence $d_0$. The outputs from the gate 15, the gate 16, the flip-flop 113+ and the flip-flop 114+ are thus at the "0", "1", "0" and "1" states respectively, thereby corresponding to the sequence $d_0$ in HDB3+ code.

The outputs from the last flips-flops 114+ and 114− in the registers 11+ and 11− are connected to the inputs 17+ and 17− of a binary-to-bipolar converter 17 at the output from the encoder 1. The converter 17 performs the inverse operation to that performed by the input converter 10. When the inputs 17+ and 17− carry the sequences 0101 and 0000, the output 170 delivers the encoded sequence $d_0 = 0+0+$ in modified HDB3 code.

The decoder 2 depicted in FIG. 4 has a structure analogous with that of the encoder 1. The decoder 2 comprises a bipolar-to-binary converter 20 whose input 200 receives the information signal in modified HDB3 code and whose two outputs 20+ and 20− deliver modified information signals in HDB3+ and HDB3− binary code. Further provided for in the decoder 2 are two shift registers 21+, 21− which each comprise four monostable flips-flops 211+ to 214+, 21− to 214−. The inputs of the first flips-flops 211+ and 211− are connected to the respective outputs 20+ and 20− of input converter 20.

In the register 21+, the outputs of the first and third flips-flops 211+ and 213+ are connected to two inverse inputs of an AND gate 22, and the outputs of the second and fourth flips-flops 212+ and 214+ are connected to two direct inputs of the gate 22. The output of the AND gate 22 is at the "1" state when the outputs of the flips-flops 211+ to 214+ are at the "0", "1", "0", "1" states respectively. The word "0101" corresponds to the sequence $d_0 = 0+0+$ converted into the positive binary code HDB3+.

The outputs of the flips-flops 211− to 214− in the other register 21− are connected to the inputs of a NOR gate 21. The output of the gate 23 is at the "1" state when the outputs of the flips-flops 211− to 214− are all at the "0" state, which corresponds to the conversion, inter alia, of the sequence $d_0 = 0+0+$ into the negative binary code HDB3−.

In the decoder 2, an AND gate 24 has two inputs connected to the outputs of the gates 22 and 23. Output 241 of the gate 24 is at the "1" sate when a sequence $d_0=0+0+$ is detected by the gates 22 and 23, thus indicating that the auxiliary signal is in the "1" state. The "1" state of the auxiliary signal is enabled later when a number of successive "1" bits at the output of the gate 24 lies between 280 and 360 for 5 ms as already stated. A "1" bit is detected in the auxiliary signal by means of an auxiliary signal restoring circuit such as circuit 28 illustrated in FIG. 4.

The circuit 28 comprises a counter 280 and a unretriggerable monostable flip-flop 281. Clock input H in counter 280 and the input of flip-flop 281 are connected to output 241 of AND gate 24. Flip-flop 281 output delivers a 5 ms pulse to a counting input of the counter 280 in response to a "1" bit of its input 241 whatever the later state on its input during the following 5 milliseconds. The counter 280 counts the sequences $d_0$ for 5 ms following in practice the positive going edge of a "1" bit in the auxiliary signal. At the end of the 5 ms, an output bus 282 of the counter 28 delivers the count of detected sequences $d_0$, i.e. the number of "1" bits on the output 241 of the gate 24 during 5 ms, to two digital comparators 283 and 284 which compare the count with integral numbers 280 and 360 respectively. Inputs of an AND gate 285 are connected to the outputs of the comparators 283 and 294. When the number of sequences $d_0$ lies between 280 and 360, the output from AND gate 285 provides a "1" bit which through a monostable flip-flop 286 is converted into a "1" bit of the auxiliary signal having an elementary period of 5 ms.

With further reference to the decoder itself, the first register 21+ comprises two OR-EXCLUSIVE gates 25 and 26 which perform the permutation of the first zero and the first +bipolar mark in the sequence $d_0$. One input of gate 25 is connected to the output of the flip-flop 211+, and the output of gate 25 is connected to the input of the following flip-flop 212+. One input of gate 26 is connected to the output of the second flip-flop 212+, and the output of gate 26 is connected to the input of the third flip-flop 213+. The other inputs of the OR-EXCLUSIVE gates 25 and 26 are connected to output 241 of gate 24. Until such time as input 241 of gate 24 is no longer in the "0" state, the information signal received at the input 200 of the decoder goes unmodified. In response to a "1" bit on output 241 of gate 24, i.e. in response to sequence "0101" and "0000" on the outputs from the flips-flops in the registers 21+ and 21−, the gate 25 decodes the first "0" bit in the sequence $d_0$ into a "1" bit corresponding to the first +bipolar mark in the sequence d, and the gate 26 decodes the first "1" bit which corresponds to the first +bipolar mark in the sequence $d_0$, into a "0" bit corresponding to the first "0" bit in the sequence d. The states of the outputs of gate 25, gate 26, flip-flop 213+ and flip-flop 214+ are "1", "0", "0" and "1" respectively, thereby corresponding to the sequence d in HDB3+ code.

The decoder 2 further comprises a binary-to-bipolar converter 27 having inputs 27+ and 27− connected to the outputs of the last flips-flops 214+ and 214+ in the registers 21+ and 21−. When the inputs 27+ and 27− carry the respective sequences "1001" and "0000", output 270 of the converter 27 delivers the sequence $d=+0\ 0+$ in HDB3 code.

Using the structures for the encoder 1 and the decoder 2 described hereinafter, those skilled in the art can design encoders and decoders for other predetermined sequences such as a, b, c to be modified into any HDBn code. Generally speaking, for a predetermined sequence having (n+1) digits in HDBn code, each of the two registers in the encoder and each of the two registers in the decoder comprises (n+1) monostable flips-flops. The two registers ascribed to the same + or − polarity as that of the bipolar mark or two marks in the predetermined sequence comprise two OR-EXCLUSIVE gates that are inserted at the outputs from the flips-flops having the same ranks in the register as those of the zero bit and the bipolar mark to be permutated in the predetermined sequence. When several sequences such as a, b, c, d are to be modified in response to the bit having the predetermined state in the auxiliary signal, several registers such as 11+, 11− in the encoder and such as 21+, 21− in the decoder correspond to said sequences depending on their modifications respectively and are connected in series; the inputs 140 of gates 14 of the register pairs in the encoder, e.g. 11+ and 11−, receive the auxiliary signal, and the outputs 241 of the gates 24 of the register pairs in the decoder, e.g. 21+ and 21−, are connected to the inputs of an OR gate with an output connected to the input of an auxiliary signal restoring circuit, such as 28.

Figure 5:
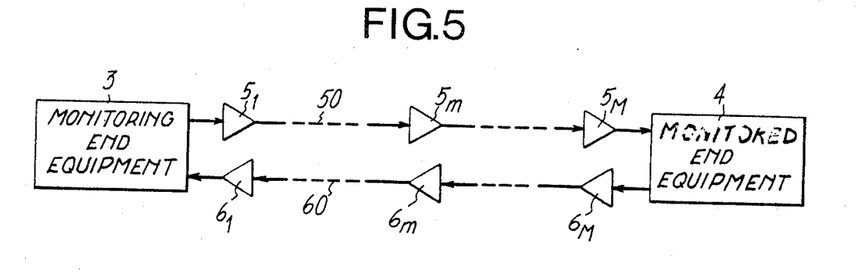
FIG. 5 is a schematic block diagram of a digital transmission line, equipped with repeater circuits in accordance with the invention.

With reference to FIG. 5, a particular application of the method embodying the invention relates to the remote monitoring of a bidirectional digital transmission line located between a monitoring end equipment 3 and a remote end equipment 4. Between the two end equipments 3 and 4, a first information digital signal is transmitted in a forward direction, from the equipment 3 to the equipment 4 via forward repeaters $5_1$ to $5_M$, and a second information digital signal is transmitted in a backward direction from the equipment 4 to the equipment 3 via backward repeaters $6_M$ to $6_1$. The transmission medium in both the forward and backward directions includes, for example, a coaxial cable 50, 60, although it may be a radio link or an optical fiber line.

The remote monitoring of the bidirectional pairs of repeaters $5_1$-$6_1$ to $5_M$-$6_M$ consists essentially of the transmission of an auxiliary signal called as a remote locate signal from the monitoring equipment 3 in the forward channel 50 and the transmission of an auxiliary signal called as a performance signal from each pair of repeaters $5_1$-$6_1$ to $5_M$-$6_M$ toward the monitoring equipment 3 via the backward line 60. The monitoring equipment 3 includes several encoders analogous to that 1 of FIG. 2 and associated with the forward channel 50 and several decoders analogous to that 2 of FIG. 3 and associated with the backward channel 60. In practice, the performance signal supplied by each pair of repeaters $5_1$-$6_1$ to $5_M$-$6_M$ indicates the error rate detected in the forward and backward information digital signals in response to the interrogation by the detected remote locate signal. The remote monitoring operation is performed step-by-step. For the monitoring equipment 3 to acquire the error rates from all the repeaters in the line, including those contained in the equipments 3 and 4, a remote monitoring and acquisition cycle is longer than the forward and backward transmission path of an auxiliary signal binary element in the transmission line 50-60.

The acquisition cycle of error rates in the forward and backward repeaters of all the pairs can be analogous to that described in U.S. Pat. No. 4,344,303 issued June 8, 1982. Referring to this patent, the control pulse transmitted in the forward direction and modulating a low frequence signal is replaced by an auxiliary remote locate sequence according to the invention. The supervisory bit pattern which indicates the error rates in both repeaters of each pair with respect to predetermined error-rate ranges and which modulates the low frequency signal, is replaced by two auxiliary response sequences according to the invention. The demodulators and modulators equipping the repeaters disclosed in U.S. Pat. No. 4,344,303 are replaced by means for detecting recurring words, such as "10", of the auxiliary remote locate signal in the forward channel and by means for introducing specific recurring performance binary words, such as "11", "10" or "01", of the auxiliary response signal in the backward channel. For instance, the latter three performance words indicate that each repeater has, during the previous remote locating and acquisition cycle, detected a certain number of errors in the respective digital signal that is less than $2^3-1$, lying between $2^3-1$ and $2^9-1$, or greater than $2^9-1$.

Figure 6:
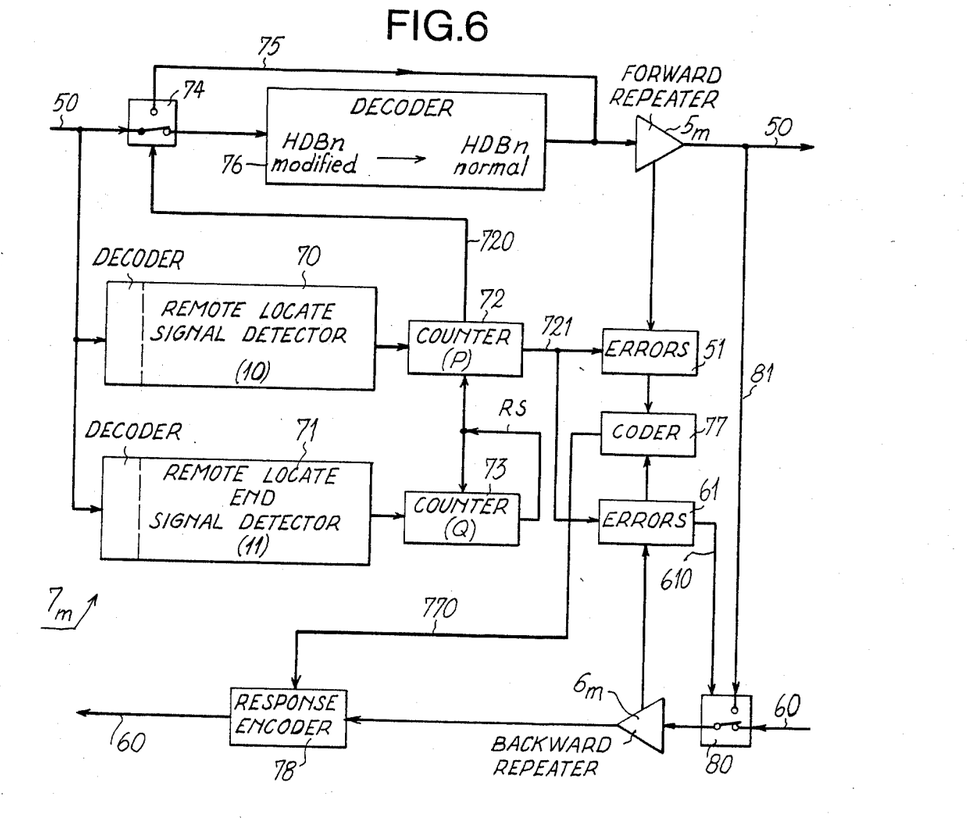
FIG. 6 is a block diagram of a remote locate circuit associated with a repeater pair in accordance with the invention.

A further method for remote monitoring repeaters is now described in reference to FIG. 6. This method enables to locate each pair of repeaters individually without remotely locating all the repeaters in the digital transmission line.

Each pair of repeaters $5_m$-$6_m$ is associated with a remote locate circuit $7_m$. On the side of monitoring equipment 3, the circuit $7_m$ comprises two detectors 70 and 71 including decoders analogous to that 2 is FIG. 4. Detectors 70 and 71 respectively decode and enable an auxiliary remote locate signal and an auxiliary so-called re-remote locate end signal transmitted in the forward channel from the monitoring end equipment 3. The remote locate signal is composed of sequences each having P successive auxiliary binary words such as "10". The remote locate end signal is composed of a sequence having Q successive auxiliary binary words such as "11". Two counters 72 and 73 count P recurring words "10" and the recurring words "11" respectively. The counter 73 is automatically reset to zero (RS) when its count has reached Q, and simultaneously controls the zero-reset in the counter 72. The count in the counter 72 is blocked at P after P detected words "10" have been counted.

Provisions are made in the forward channel 50 upstream of the input of the forward repeater 5 for a circuit with two parallel paths that are selected by a two-position switch 74 controlled by an output 720 of the counter 72. One 75 of the parallel paths is a short channel section. The other path comprises a decoder 76 in series, analogous to that 2 in FIG. 4. The decoder 76 decodes the modified predetermined sequences, such as $a_0$, $d_0$ in accordance with the invention, into normal sequences such as a, d of the information digital signal. The decoder 76 does not comprise an auxiliary signal restoring circuit such as 28, preferably.

The remote locate circuit $7_m$ comprises two error detecting and counting circuits 51 and 61 which respectively detect and count the errors in the information digital signals in the forward and backward channels through the repeaters $5_m$ and $6_m$. A coder 77 receives the error rates from the circuits 51 and 61 and codes them into binary words when the count of the counter 72 is equal to P, i.e. when P remote locate words "10" are detected in the forward channel 50. An error-rate read order is delivered from the counter 72 in a link 721 toward the circuits 51 and 61. The coding can be analogous to that described in the above U.S. Pat. No. 4,334,303. Two error binary words representative of the two error rates are delivered by the coder 77 and transmitted in series along a lead 770 to an encoder 78. The encoder 78, analogous to that 2 in FIG. 3, introduces the successive bits of the error binary words as an auxiliary response signal in accordance with the invention, into the backward channel 60 at the repeater $6_m$ output. The auxiliary response signal is composed of a sequence of two binary words which are respectively identical to the two error binary words.

Under normal operating conditions, namely in the absence of any remote locating operation and so long as the count in the counter 72 differs from P, the path 75 is opened by the switch 74 and the information signal in HDBn code flows through the decoder 76. When it comes to remote-locating the pair of repeaters $5_m$-$6_m$, where the integral number m lies between 1 and M, the monitoring equipment 3 transmits m identical auxiliary remote locate sequences each having P recurring words "10" into the forward channel 50. In the first remote locate circuit $7_1$ associated with the pair of repeaters $5_1$ and $6_1$, the detector 70 detects first of all the first sequence of "10" words which blocks the corresponding counter 72 on P. The output 720 from the counter 72 turns on the "1" state and controls the corresponding switch 74 such that the switch connects the forward channel 50 to the respective path 75 short-circuiting the respective decoder 76. As a result, prior to this switching operation, the predetermined encoded sequences such as $d_0$ in the first P words "10" replaced by corresponding HDB3 code sequences such as d in the decoder 76 which delivers the unmodified normal information signal in code HDB3 to the following repeaters $5_2$ to $5_M$; the first P auxiliary words "10" thus have no effect in the other remote locate circuits $7_2$ to $7_M$. Moreover, when the count in the counter 72 of the remote locate circuit $7_1$ reaches P, the counter 72 controls the error rate reading via the link 721 in the circuits 51 and 61 of the remote locate circuit $7_1$ followed by the coding of the error rates in the coder 77 and encoder 78 of the remote locate circuit $7_1$ for the transmission of the error binary words into the backward channel 60 toward the monitoring equipment 3.

The foregoing operations are reiterated in all the remote locate circuits $7_2$ to $7_m$. For each repeater $5_1$ to $5_m$, the respective decoder 76 corrects only the words "10" of the first auxiliary remote locate sequence supplied by the preceding repeater. The monitoring equipment 3 thus receives the auxiliary error response signals from the repeaters $5_1$-$6_1$ to $5_m$-$6_m$ at constant periods, the last one being related to the repeaters $5_m$-$6_m$.

After reception of the auxiliary error response signal derived by the remote locate circuit $7_m$, the monitoring equipment 3 transmits the auxiliary remote locate end signal having words "11" in the forward channel 50. The remote locate end signal orders all the remote locate circuits $7_1$ to $7_m$ to revert to their normal positions. Responsive to the counting Q words "11" in the counter 73 of the circuits $7_1$ to $7_m$, the counter 73 orders the zero-reset thereof as well as that of the counter 72. The counter 72 controls, via the link 720, the switch 74 in order to reintroduce the decoder 76 in series in the forward channel 50.

As shown in FIG. 6, each remote locate circuit such as $7_m$ can comprise another switch 80 controlled by an output 610 of the error detecting and counting circuit 61 associated with the backward channel 60. Under normal operating conditions, the switch 80 shuts the backward channel 60 and opens a loop-back path 81 between the output of the forward repeater $5_m$ and the input of the backward repeater $6_m$. When the circuit 61 has detected a high error rate, e.g. greater than $2^9$, or a clock absence in the backward information signal corresponding to a clean break in the link upstream on the monitored equipment 4 side, then the output 610 from the circuit 61 orders, via the switch 80, the backward channel 60 to be opened upstream of the backward repeater $6_m$ and the unidirectional loop-back path 81 to be closed. The forward information signal is thus looped via the path 81 and transmitted in the forward channel 60 toward the monitoring equipment 3. The closed path 81 makes it possible to retransmit toward monitoring equipment 3, auxiliary error signals which can be composed of words "10" and which were intended for remotely locating the repeaters following the faulty backward channel section or repeater.

Figure 7:
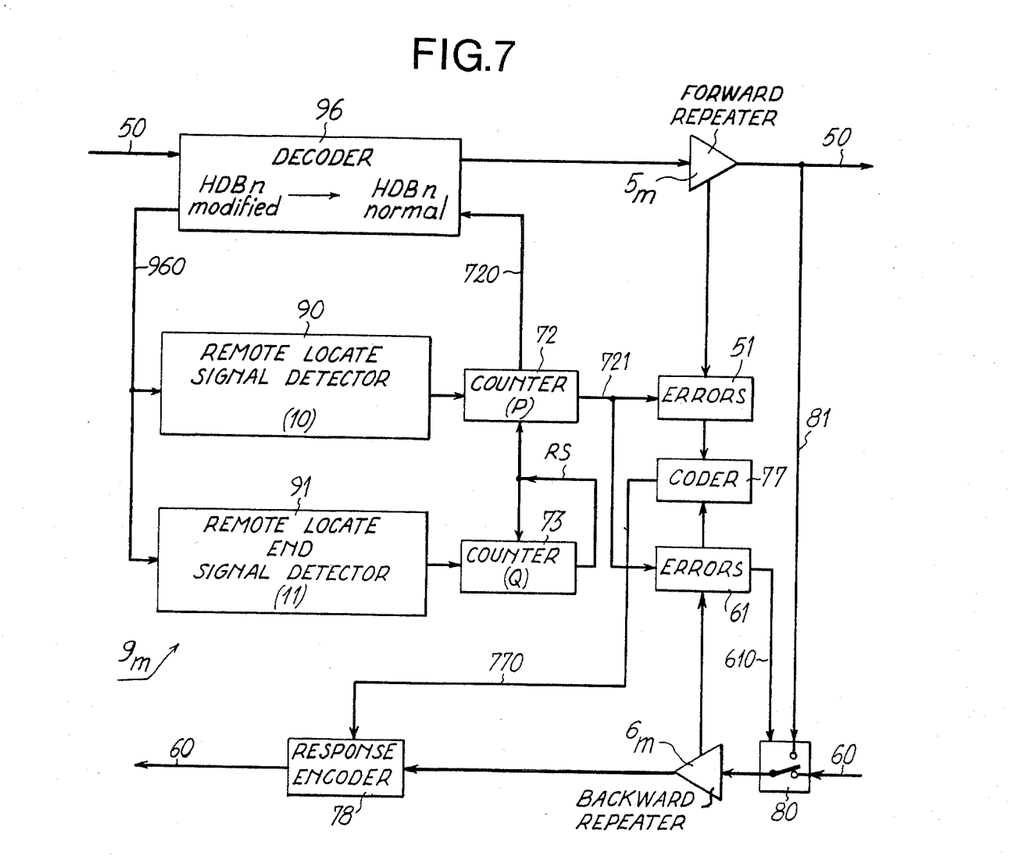
FIG. 7 is a block diagram of another remote locate circuit associated with a repeater pair in accordance with the invention.

FIG. 7 depicts a further embodiment of a remote locate circuit $9_m$ embodying the invention. The circuit $9_m$ comprises circuits 51, 61, 72, 73, 77, 78 and 80 which have structures and mutual lay-outs analogous to the corresponding ones in the remote locate circuit $7_m$ shown in FIG. 6. By way of comparison with the circuit $7_m$, the auxiliary signal decoding means at the input of the forward repeater 5 are modified with a view to cutting down on the cost of the remote locate circuit. The remote locate circuit $9_m$ no longer comprises three decoders such as the decoder 76 and those included in the detectors 70 and 71, but just one decoder 96.

The decoder 96 is analogous to that 2 in FIG. 4. The input of the bipolar-to-binary converter, such as 20 in FIG. 4, of the decoder 96 is directly connected to the preceding section of the forward channel 50. The output of the binary-to-bipolar converter, such as 27 in FIG. 4, of the decoder 96 is connected to the digital input of the forward repeater $5_m$. The output 960 of the monostable flip-flop, such as 286 in FIG. 4, of the auxiliary signal restoring circuit 28 included in the decoder 96 is connected to the input of a remote locate signal detector 90 and the input of a remote locate end signal detector 91. The circuits 90 and 91 operate as the circuits 70 and 71 in FIG. 6. The circuit 90 supplies a clock pulse to the counter 72 in response to the detection of an auxiliary binary word, such as "10", included in the remote locate sequence assigned to the pair of repeaters $5_m$-$6_m$. The circuit 91 supplies a clock pulse to the counter 73 in response to the detection of a binary word, such as "11", included in the remote locate end signal.

As already stated in reference to FIG. 6, the output 720 of the counter 72 flips over to the "1" state when the count of the counter 72 is equal to P. In the embodiment depicted in FIG. 7, the output 720 inhibits then the decoding operation in the decoder 96 such that the sequences of words "10" intended for remotely locating the following repeaters are not decoded. With reference to FIG. 4, the output 720 of the counter 72 is indicated by an inverse input 240 of the AND gate 24. When the pair of repeaters in question has been remotely located, after P words "10" are counted by counter 72, the output 720 of the counter 72 opens the AND gate or gates, such as 24, in the decoder 96 which becomes transparent to the information signal combined with the auxiliary remote locate signal and which replaces the branch 75 in the remote locate circuit $7_m$ shown in FIG. 6.

Further, remote location methods can be envisioned by those skilled in the art based on the examples given hereinafter. A specific sequence can be emitted in conjunction with the remote locate sequence "10" in order to interrogate one of the forward 51 and backward 61 error detecting and counting circuits individually. When retransmitting the backward auxiliary signals via the encoder 78, an auxiliary signal in accordance with the invention can also be derived to indicate the address of the pair of repeaters.

What I claim is:

1. A method for transmitting a signal in HBDn code combined with an auxiliary binary signal on a digital transmission medium, said auxiliary signal having a bit-rate lower than the bit-rate of said HDBn code signal, said HDBn code signal comprising four different predetermined HDBn code sequences having $(n+1)$ successive elements whose $(n-1)$ central elements are zeros and whose last element is a bipolarity violation mark, characterized in that in each of HDBn code sequences of $(n+1)$ successive elements of said HDBn code signal that are transmitted during each of binary elements of said auxiliary signal having a predetermined binary state and that are identical to one of said predetermined HDBn code sequences, a predetermined bipolar mark included in said HDBn code sequence is permuted with a zero having a predetermined rank in said HDBn code sequence thereby deriving a modified sequence.

2. The method of claim 1 wherein said permutation is also performed in each of HDBn code sequences that are identical to at least another of said predetermined HDBn code sequences and that are transmitted during each of said elements of said auxiliary signal having said predetermined binary state.

3. The method of claim 1 wherein in order to transmit a binary word of said auxiliary signal, said binary word is successively repeated a predetermined number of times.

4. The method of claim 2 wherein the ranks of said zeros respectively permutated in said two different HDBn code sequences are different.

5. The method of claim 2 wherein the first element included in said predetermined HDBn code sequences in which said permutation is performed, is a bipolar mark.

6. The method of claim 2 wherein in order to transmit a binary word of said auxiliary signal, said binary word in successively repeated a predetermined number of times.

7. An encoder for encoding a signal in HDBn code as a function of binary elements of an auxiliary binary signal having a bit-rate lower than the bit-rate of said HDBn code signal, said encoder comprising: means for detecting predetermined HDBn code sequences included in said HDBn code signal and having $(n-1)$ central element as zeros and a last element as a bipolarity violation mark, and means for permuting a predetermined bipolar mark in each of said predetermined HDBn code sequences detected during each of auxiliary binary signal elements having a predetermined binary state with a zero element having a predetermined rank in said detected predetermined HDBn code sequence thereby deriving an encoded sequence in said HDBn code signal.

8. An encoder for encoding a signal in HDBn code as a function of binary elements of an auxiliary binary signal having a bit-rate lower than the bit-rate of said HDBn code signal, said HDBn code signal including predetermined HDBn code sequences having $(n-1)$ central elements as zeros and a last element as a bipolarity violation mark, each of the predetermined HDBn code sequences received during each of auxiliary binary signal elements having a predetermined binary state being encoded into encoded sequences by means of a permutation between a bipolar mark and a zero element having a predetermined rank in said predetermined HDBn code sequence, said encoder comprising: input means for converting said HDBn code signal into first and second binary signals, said first binary signal including "1" bits corresponding to bipolar marks in said HDBn code signal having a polarity as the bipolar marks to be permuted and said second binary signal including "1" bit corresponding to the other bipolar marks in said HDBn code signal, a first shift register having (n+1) stages and receiving said first binary signal and comprising two OR-EXCLUSIVE gates inserted at outputs from two stages having same ranks in said first register as those of said bipolar mark and said zero element to be permuted in said predetermined sequences to be encoded, a second shift register having (n+1) stages and receiving said second binary signal, means connected to ouputs from said (n+1) first register stages for detecting a first binary signal (n+1)-bit word having "1" bits corresponding to the bipolar marks in each predetermined HDBn code sequence, means connected to outputs from said (n+1) second register stages for detecting a second binary signal (n+1)-bit word having all the (n+1) bits in the "0" state, means receiving said auxiliary signal for producing a "1" bit at other inputs of said OR-EXCLUSIVE gates responsive to said two (n+1)-bit words detected simultaneously during each of said auxiliary signal elements having said predetermined binary state, and output means for converting third and fourth binary signals respectively delivered by last stages of said first and second shift registers into an HDBn encoded signal including said encoded sequences.

9. A decoder for decoding an encoded signal resulting from encoding of an signal in HDBn code as a function of binary elements of an auxiliary binary signal having a bit-rate lower than the bit-rate of said HDBn code signal, said encoded signal including predetermined encoded sequences resulting from encoding of predetermined HDBn code signal sequences each having (n−1) central elements as zeros and a last element as a bipolarity violation mark by means of a permutation between a predetermined bipolar mark and a zero element having a predetermined rank in said predetermined HDBn code signal sequences during auxiliary binary signal elements having a predetermined state, said decoder comprising: means for detecting said predetermined encoded sequences, means for permuting said permuted bipolar mark and zero element in said detected encoded sequences thereby deriving said predetermined HDBn code signal sequences, and means for counting said detected encoded sequences during a time interval substantially equal to the duration of a auxiliary signal element thereby restoring said auxiliary signal.

10. A decoder for decoding an encoded signal resulting from encoding of an initial signal in HDBn code as a function of binary elements of an auxiliary binary signal having a bit-rate lower than the bit-rate of said HDBn code signal, said encoded signal including predetermined encoded sequences resulting from encoding of predetermined HDBn code signal sequences each having (n−1) central elements as zeros and a last element as a bipolarity violation mark by means of a permutation between a predetermined bipolar mark and a zero element having a predetermined rank in said predetermined HDBn code signal sequences during auxiliary binary signal elements having a predetermined binary state, said decoder comprising: input means for converting said encoded signal into first and second binary signals, said first binary signal including "1" bits corresponding to bipolar marks in said encoded signals having a same polarity as said permuted bipolar marks and said second binary signal including "1" bits corresponding to the other bipolar marks in said encoded signal, a first shift register having (n+1) stages and receiving said first binary signal and comprising two OR-EXCLUSIVE gates inserted at outputs from two stages having some ranks in said first registers as those of said permuted bipolar mark and zero element in said predetermined encoded sequences, a second shift register having (n+1) stages and receiving said second binary signal, means connected to outputs from said (n+1) first register stages for detecting a first binary signal (n+1)-bit word having "1" bits corresponding to the bipolar marks in each encoded sequence, means connected to outputs from said (n+1) second register stages for detecting a second binary signal (n+1)-bit word having all the (n+1) bits in the "0" state, means for applying a "1" bit to other inputs of said two OR-EXCLUSIVE gates responsive to said two (n+1)-bit words detected simultaneously, and output means for converting third and fourth binary signals respectively delivered by last stages of said first and second shift registers into said initial HDBn code signal.

11. The decoder of claim 10 comprising means for inhibiting the application of "1" bits to said other inputs of said OR-EXCLUSIVE gates thereby retransmitting said encoded signal from said output means during predetermined time intervals.

12. The decoder of claim 11 comprising means for counting said "1" bits applied to said other inputs of said OR-EXCLUSIVE gates during a period of one auxiliary signal binary element and means for comparing the number of "1" bits counted during said period with at least a predetermined number whereby restore one auxiliary signal element having said predetermined binary state when said number of "1" bits is greater than said predetermined number.

13. The decoder of claim 10 comprising means for counting said "1" bits applied to said other inputs of said OR-EXCLUSIVE gates during a period of one auxiliary signal binary element and means for comparing the number of "1" bits counted during said period with at least a predetermined number whereby restore one auxiliary signal element having said predetermined binary state when said number of "1" bits is greater than said predetermined number.

14. A monitoring system for monitoring a performance factor of first and second repeaters respectively included in first and second transmission channels of a bidirectional digital transmission medium between a monitoring end means and a monitored end means, said monitoring end means generating on said first channel binary words of a remote locate signal combined with a first HDBn code signal having a bit-rate greater than the bit-rate of said remote locate signal and including, during each of binary elements of said remote locate signal having a predetermined binary state, predetermined HDBn code sequences each having (n+1) successive elements whose (n−1) central elements are zeros and whose last element is a bipolarity violation mark, and including, during each of binary elements of said remote locate signal having the other binary state, encoded sequences resulting from encoding said predetermined HDBn code sequences by means of a permutation between a predetermined bipolar mark and a zero element having a predetermined rank in said HDBn code sequences;

each pair of first and second repeaters being associated with means for detecting said encoded sequences in said first channel, means for restoring said remote locate signal from said detected encoded sequences, means for detecting said performance factors of said first and second repeaters with regard to errors made in said first HDBn code signal carried by said first channel and in a second HDBn code signal transmitted on said second channel from said monitored end means, means controlled by said remote locate signal restoring means for generating a binary response signal including words representative of said detected performance factors and combined with said second HDBn code signal transmitted in said second channel toward said monitoring end means;

said second HDBn code signal having a bit-rate greater than the bit-rate of said response signal and including, during each of binary elements of said response signal having said predetermined binary state, said predetermined HDBn code sequences and including, during each of binary elements of said response signal having said other binary state, said encoded sequences.

15. A monitoring system for monitoring a performance factor of a bidirectional digital transmission medium including: a monitoring end means, a monitored end means, M pairs of first and second repeaters, where M is an integral number greater than one, a first channel for transmitting a first HDBn code signal from said monitoring end means to said monitored end means via said M first repeaters and a second channel for transmitting a second HDBn code signal from said monitored end means to said monitoring end means via said M second repeaters, an exemplary performance factor being errors in the first and second HDBn code signals susceptible of detection in said repeaters, said monitoring end means comprising means generating on said first channel encoded sequences resulting from a permutation between a predetermined bipolar mark and a zero element having a predetermined rank in each of predetermined HDBn code sequences of said first HDBn code signal during each of binary elements of a remote locate signal and a remote locate end signal having a predetermined binary state;

each predetermined HDBn code sequence being composed of (n+1) successive elements and having (n−1) central elements as zeros and a last element as a bipolarity violation mark, the bit-rate of said remote locate signal and said remote locate end signal being lower than the bit-rate of said first HDBn code signal, said remote locate signal being composed of plural remote locate sequences each having P successive identical binary words, and said remote locate end signal being composed of Q successive identical binary words transmitted after said remote locate signal, where P and Q are integral numbers greater than one;

the m first and second repeaters, where m is selectively every integral number from 1 to M, being associated with means for detecting said encoded sequences included in said first HDBn code signal in said first channel to restore said binary words of said remote locate signal, means for counting said words in the m remote locate signal sequence to derive a first control signal in response to P counted words, decoding means for converting said encoded sequences transmitted in said first channel from said monitoring end means into said predetermined HDBn code sequences to transmit said first HDBn code signal in said first channel toward said monitored end means via said m first repeater, means for short-circuiting said decoding means in response to said first control signal in order to transmit in said first channel the (m+1) to M remote locate signal sequences toward said monitored end means via said m first repeater, means for detecting performance factors of said m first and second repeaters with regard to errors made in said first and second HDBn code signals carried by said first and second channels, means activated by said first control signal for deriving a binary response signal including words representative of said detected performance factors, encoding means for replacing said predetermined HDBn code sequences of said second HDBn code signal transmitted in said second channel from said monitored end means via said m second repeater by said encoded sequences during each of binary elements of said response signal having said predetermined binary state, means for detecting said encoded sequences included in said first HDBn code signal in said first channel to restore said binary words of said remote locate end signal, and means for counting said words of said remote locate end signal to derive a second control signal in response to Q counted words, said second control signal resetting said counting means and inhibiting said short-circuiting means to insert in series said decoding means in said first channel.

16. A monitoring system for monitoring a performance factor of a bidirectional digital transmission medium including: a monitoring end means, a monitored end means, M pairs of first and second repeaters, where M is an integral number greater than one, a first channel for transmitting a first HDBn code signal from said monitoring end means to said monitored end means via said M first repeaters and a second channel for transmitting a second HDBn code signal from said monitored end means to said monitoring end means via said M second repeaters, an exemplary performance factor being errors in the first and second HDBn code signals susceptible of detection in said repeaters, said monitoring end means comprising means generating on said first channel encoded sequences resulting from a permutation between a predetermined bipolar mark and a zero element having a predetermined rank in each of predetermined HDBn code sequences of said first HDBn code signal during each of binary elements of a remote locate signal and a remote locate end signal having a predetermined binary state;

each predetermined HDBn code sequence being composed of (n+1) successive elements and having (n−1) central elements as zeros and a last element as a bipolarity violation mark, the bit-rate of said remote locate signal and said remote locate end signal being lower than the bit-rate of said first HDBn code signal, said remote locate signal being composed of plural remote locate sequences each having P successive identical binary words, and said remote locate end signal being composed of Q successive identical binary words transmitted after said remote locate signal, where P and Q are integral numbers greater than one;

the m first and second repeaters, where m is selectively every integral number from 1 to M, being associated with means for detecting said encoded sequences included in said first HDBn code signal in said first channel to restore said remote locate signal and said remote locate end signal, means for detecting said binary words of said remote locate signal in said restored remote locate and remote locate end signals, means for counting said detected words in the m remote locate signal sequence to derive a first control signal in response to P counted words, decoding means for converting said encoded sequences transmitted in said first channel from said monitoring end means into said predetermined HDBn code sequences to transmit said first HDBn code signal in said first channel toward said monitored end means via said m first repeater, means for inhibiting the decoding operation in said decoding means in response to said first control signal in order to transmit in said first channel the (m+1) to M remote locate signal sequences toward said monitored end means via said m first repeaters, means for detecting performance factors of said m first and second repeaters with regard to errors made in said first and second HDBn code signals carried by said first and second channels, means activated by said first control signal for deriving a binary response signal including words representative of said detected performance factors, encoding means for replacing said predetermined HDBn code sequences of said second HDBn code signal transmitted in said second channel from said monitored end means via said m second repeater by said encoded sequences during each of binary elements of said response signal having said predetermined binary state, means for detecting said binary words of said remote locate end signal in said restored remote locate and remote locate end signals, and means for counting said detected words of said remote locate end signal to derive a second control signal in response to Q counted words, said second control signal resetting said counting means to command again said decoding operation in said decoding means.

17. In a remote station of a system for monitoring performance factors of pairs of first and second repeaters respectively included in first and second transmission channels of a bidirectional digital transmission medium between a first end means and a second end means, said first end means generating on said first channel encoded sequences resulting from a permutation between a predetermined bipolar mark and a zero element having a predetermined rank in each of predetermined HDBn code sequences of a first HDBn code signal carried in said first channel during binary elements having a predetermined binary state and respectively included in P successive identical binary words of each of M remote locate sequences and in Q successive identical binary words of a remote locate end sequence, where M, P and Q are integral numbers greater than one;

each predetermined HDBn code sequence being composed of (n−1) successive elements and having (n−1) central elements as zeros and a last element as a bipolarity violation mark, the bit-rate of said binary words of said remote locate sequences and said remote locate end sequence being lower than the bit-rate of said first HDBn code signal; said station comprising:

the m first and second repeaters, where m is selectively every integral number from 1 to M, means for detecting said encoded sequences included in said first HDBn code signal in said first channel to restore said binary words of the m remote locate sequence, means for counting said binary words in said m remote locate sequence to derive a first control signal in response to P control words, decoding means for converting said encoded sequences transmitted in said first channel from said first end means into said predetermined HDBn code sequences to transmit said first HDBn code signal in said first channel toward said second end means via said m first repeater, means for short-circuiting said decoding means in response to said first control signal in order to transmit in said first channel the (m+1) to M remote locate sequences toward said second end means via said m first repeater, means for detecting performance factors of said m first and second repeaters with regard to errors made in said first HDBn code signals carried by said first channel and a second HDBn code signal carried in said second channel from said second end means, means activated by said first control signal for deriving a binary response sequence including words representative of said detected performance factors, encoding means for replacing said predetermined HDBn code sequences of said second HDBn code signal transmitted in said second channel via said m second repeater by said encoded sequences during each of binary elements of said response sequence having said predetermined binary state, means for detecting said encoded sequences included in said first HDBn code signal in said first channel to restore said binary words of said remote locate end sequence and means for counting said binary words of said remote locate end sequence to derive a second control signal in response to Q counted words, said control signal resetting said counting means and inhibiting said short-circuiting means to insert in series said decoding means in said first channel.

18. The station of claim 17 comprising a loop-back path selectively closed between said first channel and said second channel for connecting output of said first repeater and input of said second repeater, said performance factor detecting means associated with said m second repeater being also intended to open said second channel before said second repeater and to close said loop-back path in response to a detected error rate greater than a predetermined error rate or in response to a clock absence in said second HDBn code signal.

19. In a remote station of a system for monitoring performance factors of pairs of first and second repeaters respectively included in first channel and second transmission channels of a bidirectional digital transmission medium between a first end means and a second end means, said first end means comprising means generating on said first channel encoded sequences resulting from a permutation between a predetermined bipolar mark and a zero element having a predetermined rank in each of predetermined HDBn code sequences of a first HDBn code signal carried in said first channel during binary elements having a predetermined binary state and respectively included in P successive identical binary words of M remote locate sequences in Q successive identical binary words of a remote locate end sequence, where M, P and Q are integral numbers greater than one;

each predetermined HDBn code sequence being composed of (n+1) successive elements and having (n−1) central elements as zeros and a last element as a bipolarity violation mark, the bit-rate of said binary words of said remote locate sequences and said remote locate end sequence being lower than the bit-rate of said first HDBn code signal;

said station comprising:

the m first and second repeaters, where m is selectively every integral number from 1 to M, means for detecting said encoded sequences included in said first HDBn codes signal in said first channel to restore said remote locate sequences and said remote locate end sequence, means for detecting said binary words of the m remote locate sequence in said restored remote locate and remote locate end sequences, means for counting said detected binary words in the m remote locate sequence to derive a first control signal in response to P counted words, decoding means for converting said encoded sequences transmitted in said first channel from said first end means into said predetermined HDBn code sequences to transmit said first HDBn code signal in said first channel toward said second end means via said m first repeater, means for inhibiting the decoding operation in said decoding means in response to said first control signal in order to transmit in said first channel the (m+1) to M remote locate sequences toward said second end means via said m first repeater, means for detecting performance factors of said m first and second repeaters with regard to errors made in said first HDBn code signals carried by said first channel and a second HDBn code signal carried in said second channel from said second end means, means activated by said first control signal for deriving a binary response sequence including words representative of said detected performance factors, encoding means for replacing said predetermined HDBn code sequences of said second HDBn code signal transmitted in said second channel from said monitored end means via said m second repeater by said encoded sequences during each of binary elements of said response sequence having said predetermined binary state, means for detecting said binary words of said remote locate end sequence in said restored remote locate and remote locate end sequences, and means for counting said detected binary words of said remote locate end sequence to derive a second control signal in response to Q counted words, said second control signal resetting said counting means to command again said decoding operation in said decoding means.

20. The station of claim 19 comprising a loop-back path selectively closed between said first channel and said second channel for connecting output of said first repeater and input of said second repeater, said performance factor detecting means associated with said m second repeater being also intended to open said second channel before said second repeater and to close said loop-back path in response to a detected error rate greater than a predetermined error rate or in response to a clock absence in said second HDBn code signal.

* * * * *